United States Patent
Kim et al.

(10) Patent No.: US 10,818,968 B2
(45) Date of Patent: Oct. 27, 2020

(54) METHOD OF PREPARING A GALLIUM-DOPED LLZO SOLID ELECTROLYTE FOR AN ALL-SOLID-STATE LITHIUM SECONDARY BATTERY

(71) Applicant: KOREA INSTITUTE OF INDUSTRIAL TECHNOLOGY, Cheon-si, Chungcheongnam-do (KR)

(72) Inventors: Ho Sung Kim, Gwangju (KR); Seung Hoon Yang, Gwangju (KR); Min-young Kim, Gwangju (KR); Ha Young Jung, Gwangju (KR); Da Hye Kim, Gwangju (KR)

(73) Assignee: Korea Institute of Industrial Technology, Cheonan-si, Chungcheongnam-do (KR)

( * ) Notice: Subject to any disclaimer, the term of this patent is extended or adjusted under 35 U.S.C. 154(b) by 87 days.

(21) Appl. No.: 16/047,247

(22) Filed: Jul. 27, 2018

(65) Prior Publication Data

US 2019/0036159 A1 Jan. 31, 2019

(30) Foreign Application Priority Data

Jul. 28, 2017 (KR) .......................... 10-2017-0095944

(51) Int. Cl.
*H01M 10/0562* (2010.01)
*H01M 10/052* (2010.01)
(Continued)

(52) U.S. Cl.
CPC ....... *H01M 10/0562* (2013.01); *C04B 35/486* (2013.01); *C04B 35/63488* (2013.01);
(Continued)

(58) Field of Classification Search
CPC ........... H01M 10/0562; H01M 10/052; H01M 10/0585; H01M 4/505; H01M 4/525; H01M 4/62; H01M 4/625
See application file for complete search history.

(56) References Cited

U.S. PATENT DOCUMENTS

2016/0111751 A1   4/2016   Badding et al.
2016/0380304 A1*  12/2016  Kim .................. H01M 10/0562
                                                    429/189

FOREIGN PATENT DOCUMENTS

JP       4779988 B2     9/2011
JP    2012-224520 A    11/2012
(Continued)

OTHER PUBLICATIONS

Li, Changlong et al., "Ga-substituted Li7La3Zr2O12: An investigation based on grain coarsening in garnet-type lithium ion conductors", Journal of Alloys and Compounds, 2017, pp. 3744-3752, vol. 695 (Year: 2017).*

(Continued)

*Primary Examiner* — Karie O'Neill Apicella
(74) *Attorney, Agent, or Firm* — Rabin & Berdo, P.C.

(57) ABSTRACT

A method of preparing a gallium-doped LLZO solid electrolyte includes (a) preparing a solid electrolyte precursor slurry by subjecting a mixed solution comprising a metal aqueous solution including lanthanum (La), zirconium (Zr) and gallium (Ga), a complexing agent and a pH controller to coprecipitation; (b) preparing a solid electrolyte precursor by washing and drying the solid electrolyte precursor slurry; (c) preparing a mixture by mixing the solid electrolyte precursor with a lithium source; (d) preparing a gallium-doped LLZO solid electrolyte represented by Chemical Formula 1 below by calcining the mixture at 600 to 1,000° C.; and (e) thereafter sintering the solid electrolyte represented by Chemical Formula 1 at 1,000 to 1,300° C. By (Continued)

adjusting amounts of starting materials and controlling flow rates of supplied materials, a high-precision cubic structure with improved sintering properties is obtained and ionic conductivity of the solid electrolyte is increased.

$Li_xGa_yLa_zZr_wO_{12}$, ($5 \leq x \leq 9$, $0 < y \leq 4$, $2 \leq z \leq 4$, $1 \leq w \leq 3$) Chemical Formula 1

7 Claims, 8 Drawing Sheets

(51) Int. Cl.
　　　*H01M 4/525*　　　(2010.01)
　　　*H01M 4/62*　　　(2006.01)
　　　*H01M 4/505*　　　(2010.01)
　　　*H01M 10/0585*　　(2010.01)
　　　*C04B 35/486*　　　(2006.01)
　　　*C04B 35/634*　　　(2006.01)
　　　*H01M 4/131*　　　(2010.01)
(52) U.S. Cl.
　　　CPC ........... *H01M 4/131* (2013.01); *H01M 4/505* (2013.01); *H01M 4/525* (2013.01); *H01M 4/62* (2013.01); *H01M 4/625* (2013.01); *H01M 10/052* (2013.01); *C04B 2235/3203* (2013.01); *C04B 2235/3217* (2013.01); *C04B 2235/3227* (2013.01); *C04B 2235/3286* (2013.01); *C04B 2235/6025* (2013.01); *C04B 2235/6567* (2013.01); *H01M 10/0585* (2013.01); *H01M 2300/0077* (2013.01)

(56) References Cited

FOREIGN PATENT DOCUMENTS

| | | |
|---|---|---|
| JP | 2016-035912 A | 3/2016 |
| KR | 10-2017-0034146 A | 3/2017 |
| WO | WO 2014/051032 A1 | 4/2014 |
| WO | WO 2016/125716 A1 | 8/2016 |

OTHER PUBLICATIONS

Changlong Li et al., "Ga-substituted $Li_7La_3Zr_2O_{12}$: An investigation based on grain coarsening in garnet-type lithium ion conductors", Journal of Alloys and Compounds, 2017, pp. 3744-3752, vol. 695.
Korean Office Action dated Sep. 18, 2018.
Randy Jalem et al., "Effects of Gallium Doping in Garnet-Type $Li_7La_3Zr_2O_{12}$ Solid Electrolytes", Chemistry of Materials, 2015, pp. 2821-2831, vol. 27.
Japanese Office Action dated Jul. 31, 2019.

* cited by examiner

Example 1

Example 2

Comparative Example 1

Comparative Example 2

Example 1

Comparative Example 1

Comparative Example 2

METHOD OF PREPARING A GALLIUM-DOPED LLZO SOLID ELECTROLYTE FOR AN ALL-SOLID-STATE LITHIUM SECONDARY BATTERY

BACKGROUND OF THE INVENTION

1. Technical Field

The present invention relates to a solid electrolyte for an all-solid-state lithium secondary battery, a method of preparing the same, and an all-solid-state lithium secondary battery comprising the same. More particularly, the present invention relates to a solid electrolyte for an all-solid-state lithium secondary battery and a method of preparing the same, in which the amounts of gallium (Ga) and lithium (Li) of starting materials are adjusted, and a coprecipitation process is carried out through a Taylor reaction while controlling the flow of a material mixture (turbulence control), thus forming a high-precision cubic structure and improving sintering properties to thereby increase the ionic conductivity of the solid electrolyte, and to an all-solid-state lithium secondary battery comprising the same.

2. Description of the Related Art

Since lithium secondary batteries have large electrochemical capacity, high operating potential and excellent charge/discharge cycle characteristics, there is increasing demand therefor for applications such as portable information terminals, portable electronic devices, small-sized power storage devices for home use, motorcycles, electric vehicles, hybrid electric vehicles, etc. Due to the spread of such applications, improved safety and increasingly high performance of lithium secondary batteries are required.

Conventional lithium secondary batteries use a liquid electrolyte and are readily ignited when exposed to water in the air, thus posing a stability problem. This stability issue is becoming more important as electric vehicles become more commercially viable.

Hence, recently, thorough research is ongoing into an all-solid-state secondary battery using a solid electrolyte formed of a non-combustible inorganic material for the purpose of safety improvement. An all-solid-state secondary battery is receiving attention as a next-generation secondary battery with the goals of improved stability, high energy density, high power output, long life, simplification of manufacturing processes, formation of large/compact batteries, and reduced costs.

An all-solid-state lithium secondary battery is configured to include a cathode/a solid electrolyte layer/an anode, in which the solid electrolyte of the solid electrolyte layer is required to have high ionic conductivity and low electronic conductivity. Furthermore, the cathode and the anode, which are electrode layers, include a solid electrolyte, and the solid electrolyte used for the electrode layers is preferably made up of a mixed conductive material having both high ionic conductivity and high electronic conductivity.

The solid electrolyte, which satisfies requirements of the solid electrolyte layer of the all-solid-state secondary battery, includes a sulfide-based solid electrolyte, an oxide-based solid electrolyte, etc. Among these, a sulfide-based solid electrolyte is problematic in that a resistance component is generated due to the interfacial reaction with the cathode active material or the anode active material, hygroscopicity is strong, and hydrogen sulfide ($H_2S$) gas, which is toxic, is generated.

Japanese Patent No. 4,779,988 discloses an all-solid-state lithium secondary battery having a stacked structure comprising a cathode/a solid electrolyte layer/an anode and composed of a sulfide-based solid electrolyte layer.

Widely known examples of an oxide-based solid electrolyte include LLTO ($Li_{3x}La_{2/(3-x)}TiO_3$), LLZO ($Li_7La_3Zr_2O_{12}$), etc., among which LLZO, having relatively high grain boundary resistance but superior potential window characteristics compared to LLTO, is receiving attention as a promising material.

Although LLZO has advantages such as high ionic conductivity, low reactivity with an electrode material, a wide potential window (0-6V), and the like, it is difficult to control processing conditions due to volatilization of lithium (Li) during a sintering process, and the preparation thereof is complicated and difficult owing to the low sinterability thereof, making it hard to realize real-world application of LLZO. Moreover, since the ionic conductivity greatly varies depending on the crystal structure, there is a need to develop techniques for controlling the crystal structure of LLZO by adjusting the starting material composition, sintering properties, and the like.

SUMMARY OF THE INVENTION

Accordingly, the present invention has been made keeping in mind the problems encountered in the related art, and the present invention is intended to provide a solid electrolyte for an all-solid-state lithium secondary battery and a method of preparing the same, in which the amounts of gallium (Ga) and lithium (Li) of starting materials may be adjusted and the flow of a material mixture may be controlled (turbulence control) through a Taylor reaction, thus forming a high-precision cubic structure and improving sintering properties, thereby increasing the ionic conductivity of the solid electrolyte.

In addition, the present invention is intended to provide an all-solid-state lithium secondary battery including the aforementioned solid electrolyte.

Therefore, an aspect of the present invention provides a gallium (Ga)-doped LLZO (lithium lanthanum zirconium oxide) solid electrolyte, represented by Chemical Formula 1 below.

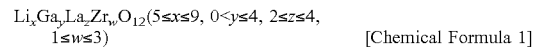

$Li_xGa_yLa_zZr_wO_{12}$ (5≤x≤9, 0<y≤4, 2≤z≤4, 1≤w≤3)  [Chemical Formula 1]

The gallium (Ga)-doped LLZO solid electrolyte may have an ionic conductivity of $1.2 \times 10^{-3}$ to $1.6 \times 10^{-3}$ and a single-phase cubic structure.

Another aspect of the present invention provides a method of preparing a gallium-doped LLZO solid electrolyte, comprising: (a) preparing a solid electrolyte precursor slurry by subjecting a mixed solution comprising a metal aqueous solution including lanthanum (La), zirconium (Zr) and gallium (Ga), a complexing agent and a pH controller to coprecipitation; (b) preparing a solid electrolyte precursor by washing and drying the solid electrolyte precursor slurry; (c) preparing a mixture by mixing the solid electrolyte precursor with a lithium source; and (d) preparing a gallium-doped LLZO solid electrolyte represented by Chemical Formula 1 below by calcining the mixture at 600 to 1,000° C., step (a) being performed using a Couette-Taylor vortex reactor.

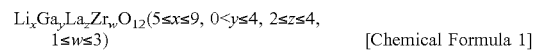

$Li_xGa_yLa_zZr_wO_{12}$ (5≤x≤9, 0<y≤4, 2≤z≤4, 1≤w≤3)  [Chemical Formula 1]

Also, the ratio (M1:M2) of mol (M1) of the lithium element of the lithium source in step (c) to mol (M2) of the gallium element of the metal aqueous solution in step (a) may be adjusted such that a ratio (m1:m2) of mol (m1) of the lithium element to mol (m2) of the gallium element in Chemical Formula 1 is controlled to fall within the range from 6.7:0.1 to 5.8:0.4.

Also, the ratio (M1:M2) of mol (M1) of the lithium element of the lithium source in step (c) to mol (M2) of the gallium element of the metal aqueous solution in step (a) may be adjusted such that the ratio (m1:m2) of mol (m1) of the lithium element to mol (m2) of the gallium element in Chemical Formula 1 is controlled to fall within the range from 6.55:0.15 to 6.25:0.25.

Also, the method of the invention may further comprise (e) sintering the solid electrolyte represented by Chemical Formula 1 at 1,000 to 1,300° C., after step (d).

The metal aqueous solution may include lanthanum nitrate hydrate ($La(NO_3)_3 \cdot xH_2O$), zirconium hydrochloride hydrate ($ZrOCl_2 \cdot xH_2O$) and gallium nitrate hydrate ($Ga(NO_3)_3 \cdot xH_2O$), x being independently any one integer of 1 to 9.

Also, the complexing agent may be ammonium hydroxide ($NH_4OH$).

Also, the pH controller may be sodium hydroxide (NaOH).

Also, the lithium source may be lithium hydroxide hydrate ($LiOH \cdot H_2O$).

The gallium (Ga)-doped LLZO solid electrolyte may have an ionic conductivity of $1.2 \times 10^{-3}$ to $1.6 \times 10^{-3}$ and a single-phase cubic structure.

Still another aspect of the present invention provides an all-solid-state lithium secondary battery, comprising: a cathode containing a first LLZO, a first conductive polymer, a cathode active material, a first lithium salt and a conductive material; an anode containing lithium metal; and a composite solid electrolyte layer disposed between the cathode and the anode and configured to contain a second LLZO, a second conductive polymer and a second lithium salt, in which the first LLZO and the second LLZO are each independently a gallium (Ga)-doped LLZO solid electrolyte, and the gallium (Ga)-doped LLZO solid electrolyte is represented by Chemical Formula 1 below.

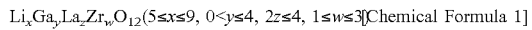

$Li_xGa_yLa_zZr_wO_{12}$ ($5 \leq x \leq 9$, $0 < y \leq 4$, $2z \leq 4$, $1 \leq w \leq 3$) [Chemical Formula 1]

The gallium (Ga)-doped LLZO solid electrolyte may have an ionic conductivity of $1.2 \times 10^{-3}$ to $1.6 \times 10^{-3}$ and a single-phase cubic structure.

In the all-solid-state lithium secondary battery according to an embodiment of the present invention, the cathode may include, based on 100 parts by weight of the cathode active material, 5 to 70 parts by weight of the first LLZO, 5 to 25 parts by weight of the first conductive polymer, and 5 to 25 parts by weight of the conductive material, and the composite solid electrolyte layer may include, based on 100 parts by weight of the second LLZO, 1 to 300 parts by weight of the conductive polymer.

Also, the first conductive polymer and the second conductive polymer may each independently include at least one selected from the group consisting of polyethylene oxide, polyethylene glycol, polypropylene oxide, polyphosphazene, polysiloxane and copolymers thereof.

Also, each of the first conductive polymer and the second conductive polymer may independently be polyethylene oxide having an average molecular weight of 500 to 1,000,000.

Also, the cathode active material may be a Ni—Co—Mn ternary lithium metal oxide (NCM) represented by Chemical Formula 3 below.

$LiNi_pCo_qMn_rO_2$ [Chemical Formula 3]

In Chemical Formula 3, $0 < p < 0.9$, $0 < q < 0.5$, $0 < r < 0.5$, and $p+q+r=1$.

Also, the conductive material may include at least one selected from among carbon black, acetylene black, and Ketjen black.

Also, each of the first lithium salt and the second lithium salt may independently be at least one selected from among lithium perchlorate ($LiClO_4$), lithium trifluoromethane sulfonate ($LiCF_3SO_3$), lithium hexafluorophosphate ($LiPF_6$), lithium tetrafluoroborate ($LiBF_4$), and lithium bistrifluoromethanesulfonyl imide ($LiN(CF_3SO_2)_2$).

In the all-solid-state lithium secondary battery, the first conductive polymer and the second conductive polymer may be polyethylene oxide, the cathode active material may be Ni—Co—Mn ternary lithium metal oxide (NCM), the first lithium salt and the second lithium salt may be lithium perchlorate ($LiClO_4$), and the conductive material may be carbon black.

In a method of preparing a solid electrolyte according to the present invention, the amounts of gallium (Ga) and lithium (Li) of starting materials are adjusted, and a coprecipitation process is performed through a Taylor reaction while controlling the flow rate of materials to be supplied, thus forming a high-precision cubic structure and improving sintering properties, thereby increasing the ionic conductivity of the solid electrolyte.

DESCRIPTION OF SPECIFIC EMBODIMENTS

The present invention may be embodied in many different forms, and should not be construed as being limited only to the embodiments set forth herein, but should be understood to cover all modifications, equivalents or alternatives falling within the ideas and technical scope of the present invention. In the description of the present invention, detailed descriptions of related known techniques incorporated herein will be omitted when the same may make the gist of the present invention unclear.

As used herein, the terms "first", "second", etc. may be used to describe various elements, but these elements are not to be limited by these terms. These terms are only used to distinguish one element from another. For example, a first element may be termed a second element, and similarly, a second element may be termed a first element, without departing from the scope of the present invention.

Further, it will be understood that when an element is referred to as being "formed" or "stacked" on another element, it can be formed or stacked so as to be directly attached to all surfaces or one surface of the other element, or intervening elements may be present therebetween.

Unless otherwise stated, the singular expression includes a plural expression. In this application, the terms "include" or "have" are used to designate the presence of features, numbers, steps, operations, elements, parts, or combinations thereof described in the specification, and should be understood as not excluding the presence or additional possible presence of one or more different features, numbers, steps, operations, elements, parts, or combinations thereof.

The present invention pertains to a gallium (Ga)-doped LLZO solid electrolyte represented by Chemical Formula 1 below.

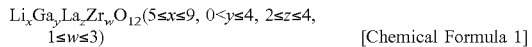
$\text{Li}_x\text{Ga}_y\text{La}_z\text{Zr}_w\text{O}_{12} (5 \leq x \leq 9, 0 < y \leq 4, 2 \leq z \leq 4, 1 \leq w \leq 3)$ [Chemical Formula 1]

The gallium (Ga)-doped LLZO solid electrolyte may be represented by Chemical Formula 2 below.

$\text{Li}_{7-3x}\text{Ga}_x\text{La}_3\text{Zr}_2\text{O}_{12} (0.1 \leq x \leq 0.4)$ [Chemical Formula 2]

The gallium (Ga)-doped LLZO solid electrolyte may have an ionic conductivity of $1.2 \times 10^{-3}$ to $1.6 \times 10^{-3}$ and a single-phase cubic structure.

Figure 1:
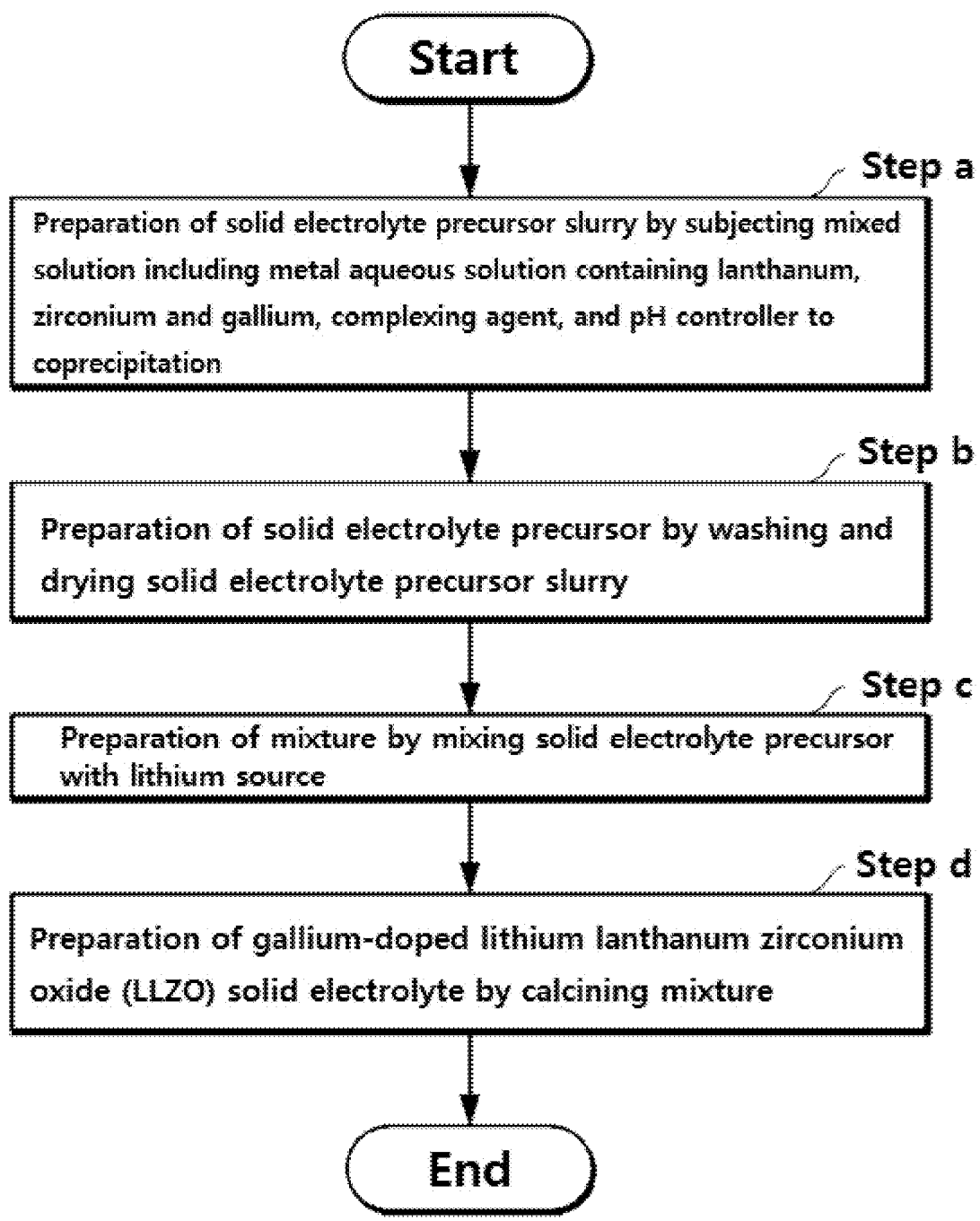
FIG. 1 is a flowchart showing a process of preparing a solid electrolyte according to the present invention.

FIG. 1 is a flowchart showing the process of preparing a gallium (Ga)-doped LLZO solid electrolyte according to the present invention.

Below is a description of the method of preparing the gallium (Ga)-doped LLZO solid electrolyte according to the present invention, made with reference to FIG. 1, which is merely set forth to illustrate but is not to be construed as limiting the present invention, and the present invention will be defined by the accompanying claims.

According to the present invention, the method of preparing the gallium (Ga)-doped LLZO solid electrolyte includes (a) preparing a solid electrolyte precursor slurry by subjecting a mixed solution comprising a metal aqueous solution including lanthanum (La), zirconium (Zr) and gallium (Ga), a complexing agent and a pH controller to coprecipitation; (b) preparing a solid electrolyte precursor by washing and drying the solid electrolyte precursor slurry; (c) preparing a mixture by mixing the solid electrolyte precursor with a lithium source; and (d) preparing the gallium-doped LLZO solid electrolyte represented by Chemical Formula 1 below by calcining the mixture at 600 to 1,000° C., step (a) being performed using a Couette-Taylor vortex reactor.

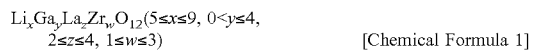
$\text{Li}_x\text{Ga}_y\text{La}_z\text{Zr}_w\text{O}_{12} (5 \leq x \leq 9, 0 < y \leq 4, 2 \leq z \leq 4, 1 \leq w \leq 3)$ [Chemical Formula 1]

In addition, the gallium (Ga)-doped LLZO solid electrolyte may be represented by Chemical Formula 2 below.

$\text{Li}_{7-3x}\text{Ga}_x\text{La}_3\text{Zr}_2\text{O}_{12} (0.1 \leq x \leq 0.4)$ [Chemical Formula 2]

Specifically, a mixed solution, comprising a metal aqueous solution including lanthanum, zirconium and gallium, a complexing agent and a pH controller, which are mixed together, is subjected to coprecipitation, thus preparing a solid electrolyte precursor slurry (step a).

The metal aqueous solution may include lanthanum nitrate hydrate ($\text{La(NO}_3\text{)}_3 \cdot x\text{H}_2\text{O}$), zirconium hydrochloride hydrate ($\text{ZrOCl}_2 \cdot x\text{H}_2\text{O}$) and gallium nitrate hydrate ($\text{Ga(NO}_3\text{)}_3 \cdot x\text{H}_2\text{O}$), in which x may be independently any one integer of 1 to 9.

The complexing agent may include ammonium hydroxide ($\text{NH}_4\text{OH}$), sodium hydroxide, etc.

Also, the pH controller may include, but is not limited to, sodium hydroxide, ammonia, etc. Any pH controller may be used, so long as it does not affect the properties of a solid oxide having ionic conductivity and is able to adjust the pH of the mixed solution.

Step (a) may be performed using a Couette-Taylor vortex reactor.

Figure 2:
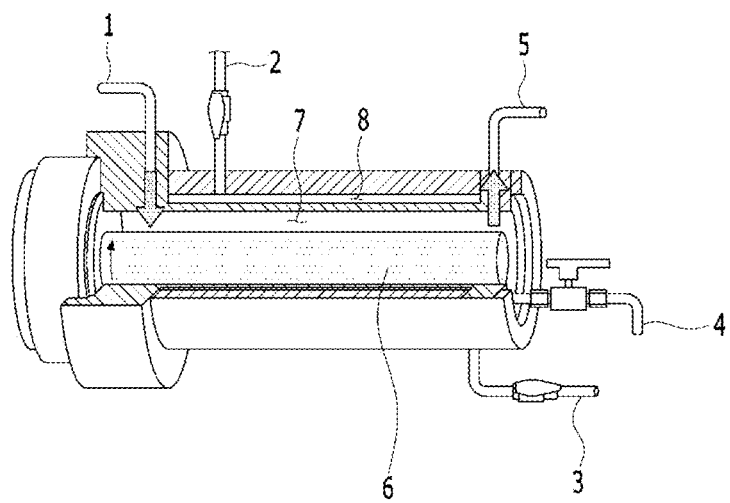
FIG. 2 schematically shows a Couette-Taylor vortex reactor.

FIG. 2 schematically shows a Couette-Taylor vortex reactor.

With reference to FIG. 2, the Couette-Taylor vortex reactor for a Couette-Taylor vortex reaction includes an outer fixed cylinder and an inner rotary cylinder that rotates therein. The inner rotary cylinder has a rotational axis that is coincident with the longitudinal axis of the outer fixed cylinder. The inner rotary cylinder and the outer fixed cylinder are spaced apart from each other by a predetermined interval, and thus a fluid passage through which a reaction liquid flows is formed between the inner rotary cylinder and the outer fixed cylinder. When the inner rotary cylinder rotates, the fluid, which is located at the inner rotary cylinder in the fluid passage, tends to flow in the direction of the outer fixed cylinder by means of centrifugal force, whereby the fluid becomes unstable to thus form vortices in a ring-pair array rotating regularly and in opposite directions along the rotational axis, which are called a Taylor or Couette-Taylor vortex. The Couette-Taylor vortex may promote a coprecipitation reaction, thereby efficiently preparing a precursor compared to when a conventional coprecipitation reactor is used.

Here, the Couette-Taylor reactor makes it possible to distinguish the characteristics of the fluid flow and to define the corresponding region depending on each characteristic using a dimensionless parameter, namely a Taylor number (Ta). The Taylor number (Ta) is represented as a function of the Reynolds number (Re), and is expressed by Equation 1 below.

$$Re = \frac{\omega r_i d}{v} \qquad \text{[Equation 1]}$$

$$Ta = Re\left(\frac{d}{r_i}\right)$$

In Equation 1, w indicates the angular speed of the inner cylinder, $r_i$ is the radius of the inner cylinder, d is the distance between two cylinders parallel to each other, and v is the dynamic viscosity. Typically, the value of Taylor number (Ta) is adjusted using revolutions per minute (RPM), representing the angular speed of the inner cylinder. Generally, when a fluid flows between two planar plates, a Couette flow occurs due to shear stress. Similarly, a Couette flow also occurs at low RPM between the two cylinders. However, when the RPM of the inner cylinder exceeds a predetermined threshold, a Couette flow is converted into a new steady state, namely a Couette-Taylor flow, and a Taylor vortex, which cannot be observed in a Couette flow, occurs. The Taylor vortex is made up of a pair of two vortices, which are line symmetrical and are oriented in a toroidal direction. Accordingly, a vortex that rotates in a counterclockwise direction is present beside a vortex that rotates in a clockwise direction, and thus these vortices affect each other. In a Couette-Taylor flow, when the predetermined RPM is increased, a new flow is created due to an increase in the instability of the Taylor vortex. Here, the Taylor vortex has an azimuthal wavenumber. This flow is referred to as a wavy vortex flow, and the mixing effect thereof may be greater than that of the Couette-Taylor flow.

Next, the solid electrolyte precursor slurry is washed and dried, thus preparing a solid electrolyte precursor (step b).

The solid electrolyte precursor slurry is washed with water, and thus the solid electrolyte precursor may have a pH of about 7.

Next, the washed and dried solid electrolyte precursor is mixed with a lithium source, thus preparing a mixture (step c).

The ratio (M1:M2) of mol (M1) of the lithium element of the lithium source in step (c) to mol (M2) of the gallium element of the metal aqueous solution in step (a) may be adjusted such that the ratio (m1:m2) of mol (m1) of the lithium element to mol (m2) of the gallium element in Chemical Formula 1 is controlled to fall within the range from 6.7:0.1 to 5.8:0.4, and preferably 6.55:0.15 to 6.25:0.25.

The ratio (M1:M2) of mol (M1) of the lithium element of the lithium source in step (c) to mol (M2) of the gallium element of the metal aqueous solution in step (a) may be adjusted, thus controlling the crystal structure of the solid electrolyte and improving sintering properties. If the molar ratio (M1:M2) is less than 6.7:0.1, the amount of doped Ga, which is necessary to form a cubic structure, is insufficient, thus making it difficult to control sinterability, thereby lowering ionic conductivity. On the other hand, if the molar ratio exceeds 5.8:0.4, Ga is excessively added, and thus the sintering density of the pellet may decrease, undesirably lowering ionic conductivity.

Also, the lithium source may include lithium hydroxide hydrate ($LiOH \cdot H_2O$), lithium hydroxide (LiOH), lithium nitrate ($LiNO_3$), lithium cobaltate ($LiCoO_3$), etc.

The lithium of the lithium source may be added in excess, taking into consideration the amount of lithium that evaporates upon calcination or sintering. The amount of lithium of the lithium source, which is included in the mixture, may be 101 to 125 parts by weight, preferably 103 to 120 parts by weight, and more preferably 105 to 115 parts by weight, based on 100 parts by weight of lithium of the final product, that is, the gallium (Ga)-doped LLZO solid electrolyte.

Specifically, the lithium of the lithium source may be included in the above mixture so that the amount thereof is greater by 1 to 20 wt %, and preferably 5 to 15 wt %, than the amount of the lithium element in the solid electrolyte that is finally produced.

The higher the lithium content, the better the solid electrolyte. Also, the solid electrolyte may have high ionic conductivity when the structure thereof is cubic, and may have low ionic conductivity when the structure thereof is tetragonal.

In some cases, the precursor may be pulverized before being mixed with the lithium source.

The pulverization and mixing processes may be performed using a ball mill.

Finally, the mixture is calcined at 600 to 1,000° C., thus preparing a gallium-doped LLZO solid electrolyte represented by Chemical Formula 1 below (step d).

$Li_xGa_yLa_zZr_wO_{12}$ (5≤x≤9, 0<y≤4, 2≤z≤4, 1≤w≤3)     [Chemical Formula 1]

In addition, the gallium (Ga)-doped LLZO solid electrolyte may be represented by Chemical Formula 2 below.

$Li_{7-3x}Ga_xLa_3Zr_2O_{12}$ (0.1≤x≤0.4)     [Chemical Formula 2]

The gallium (Ga)-doped LLZO solid electrolyte may have an ionic conductivity of $1.2 \times 10^{-3}$ to $1.6 \times 10^{-3}$ and a single-phase cubic structure.

The calcination may be performed at 600 to 1,000° C., preferably 800 to 950° C., and more preferably 880 to 920° C.

The calcination may be performed for 1 to 20 hr, and preferably 1 to 7 hr. However, the calcination time is not necessarily limited thereto, and may vary depending on the calcination temperature.

In some cases, the method of the invention may further include (e) sintering the solid electrolyte represented by Chemical Formula 1 at 1,000 to 1,300° C., after step (d).

The sintering may be performed at 1,000 to 1,300° C., preferably 1,100 to 1,250° C., and more preferably 1,150 to 1,220° C.

The sintering may be performed for 3 to 7 hr, and preferably 4 to 6 hr. However, the sintering time is not necessarily limited thereto, and may vary depending on the sintering temperature.

The solid electrolyte and the sintered solid electrolyte may include at least one structure selected from among a cubic structure and a tetragonal structure, and preferably, the solid electrolyte and the sintered solid electrolyte have a single-phase cubic structure.

As described above, the solid electrolyte preferably has a cubic structure to thus realize high ionic conductivity, and the ionic conductivity thereof may decrease in the case of a tetragonal structure.

Figure 9:
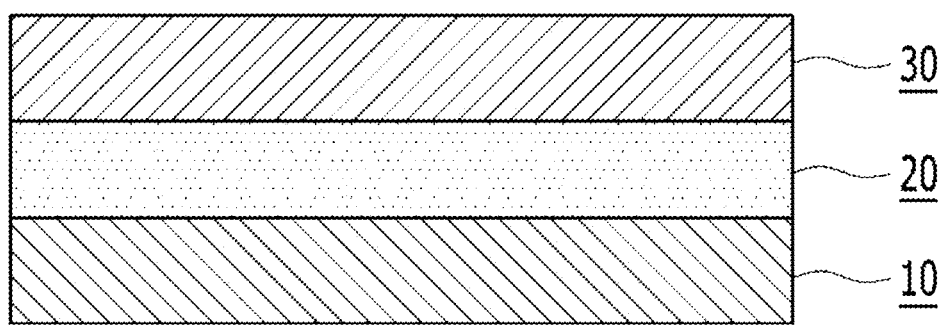
FIG. 9 schematically shows an all-solid-state lithium secondary battery according to the present invention.

FIG. 9 schematically shows an all-solid-state lithium secondary battery according to the present invention. Here, PEO as the conductive polymer, a Ni—Co—Mn ternary lithium metal oxide (NCM) as the cathode active material, and a lithium metal anode are stacked by way of example, but the scope of the present invention is not limited thereto.

Below is a description of the all-solid-state lithium secondary battery according to the present invention, made with reference to FIG. 9, which is merely set forth to illustrate but is not to be construed as limiting the present invention, and the present invention will be defined by the accompanying claims.

With reference to FIG. 9, the all-solid-state lithium secondary battery 100 according to the present invention includes a cathode 10 containing a first LLZO, a first conductive polymer, a cathode active material, a first lithium salt and a conductive material, an anode 30 containing lithium metal, and a composite solid electrolyte layer 20 disposed between the cathode 10 and the anode 30 and configured to contain a second LLZO, a second conductive polymer and a second lithium salt. Here, the first LLZO and the second LLZO are each independently a gallium (Ga)-doped LLZO solid electrolyte, and the gallium (Ga)-doped LLZO solid electrolyte may be represented by Chemical Formula 1 below.

$$Li_xGa_yLa_zZr_wO_{12} (5 \leq x \leq 9, 0 < y \leq 4, 2 \leq z \leq 4, 1 \leq w \leq 3)$$ [Chemical Formula 1]

Also, the gallium (Ga)-doped LLZO solid electrolyte may be represented by Chemical Formula 2 below.

$$Li_{7-3x}Ga_xLa_3Zr_2O_{12} (0.1 \leq x \leq 0.4)$$ [Chemical Formula 2]

Also, the gallium (Ga)-doped LLZO solid electrolyte may have an ionic conductivity of $1.2 \times 10^{-3}$ to $1.6 \times 10^{-3}$.

In the present invention, the gallium (Ga)-doped LLZO solid electrolyte may have a cubic structure or a tetragonal structure, and preferably has a single-phase cubic structure.

In the all-solid-state lithium secondary battery 100 according to the present invention, the cathode 10 may include, based on 100 parts by weight of the cathode active material, 5 to 70 parts by weight of the first LLZO, 5 to 25 parts by weight of the first conductive polymer, and 5 to 25 parts by weight of the conductive material. The cathode 10 preferably includes 10 to 20 parts by weight of the first conductive polymer based on 100 parts by weight of the cathode active material.

Depending on the amount of the cathode active material contained in the cathode 10, the cycle characteristics of the all-solid-state lithium secondary battery may be improved, and preferably, the first LLZO is contained in an amount of 10 to 40 parts by weight based on 100 parts by weight of the cathode active material.

The composite solid electrolyte layer 20 may include 1 to 300 parts by weight of the second conductive polymer based on 100 parts by weight of the second LLZO, and preferably 1 to 250 parts by weight of the second conductive polymer based on 100 parts by weight of the second LLZO.

In the present invention, the first conductive polymer and the second polymer electrolyte are each independently polyethylene oxide, polyethylene glycol, polypropylene oxide, polyphosphazene, polysiloxane and copolymers thereof. Preferably, polyethylene oxide having an average molecular weight of 500 to 1,000,000, and more preferably 1,000 to 600,000, is used.

According to the present invention, both the cathode 10 and the composite solid electrolyte layer 20 contain a gallium (Ga)-doped LLZO and a polymer electrolyte, thus enhancing interfacial properties between active material particles, between solid electrolyte particles, and between an electrolyte layer and an electrode, thereby improving the discharge capacity and cycle characteristics of the all-solid-state lithium secondary battery.

More specifically describing the polymer electrolyte, a polymer electrolyte typically indicates a conductive polymer having conductivity of at least $10^{-7}$ Scm$^{-1}$ (equal to or greater than that of a semiconductor), and in most cases, a polymer is doped with an electron acceptor or an electron donor to thus obtain high conductivity. The doped polyethylene, polypyrrole, polythiophene, and the like are typical well-known conductive polymers. In the present invention, the choice of a conductive polymer that may be complexed with a lithium salt to attain optimal ionic conductivity is preferable, and polyethylene oxide is preferably used.

Examples of the cathode active material may include, but are not limited to, at least one transition metal-substituted compound or a lamellar compound, such as lithium cobalt oxide (LiCoO$_2$), lithium nickel oxide (LiNiO$_2$), etc.; lithium manganese oxide, such as Li$_{1+x}$Mn$_{2-x}$O$_4$ (wherein x is 0 to 0.33), LiMnO$_3$, LiMn$_2$O$_3$, LiMnO$_2$, etc.; lithium copper oxide (Li$_2$CuO$_2$); vanadium oxide, such as LiV$_3$O$_8$, LiV$_3$O$_4$, V$_2$O$_5$, Cu$_2$V$_2$O$_7$, etc.; Ni site-type lithium nickel oxide represented by LiNi$_{1-x}$M$_x$O$_2$ (wherein M is Co, Mn, Al, Cu, Fe, Mg, B or Ga, and x is 0.01 to 0.3); lithium manganese composite oxide represented by LiMn$_{2-x}$M$_x$O$_2$ (wherein M is Co, Ni, Fe, Cr, Zn or Ta, and x is 0.01 to 0.1) or Li$_2$Mn$_3$M$_x$O$_5$ (wherein M is Fe, Co, Ni, Cu or Zn); LiMn$_2$O$_4$, a portion of the Li of which is substituted with an alkaline earth metal ion; a disulfide compound; Fe$_2$(MoO$_4$)$_3$; and Li[Ni$_{1/3}$Co$_{1/3}$Mn$_{1/3}$O]$_2$ represented by Li[Ni$_x$Co$_{1-2x}$M$_n$O]$_2$ (0<x<0.5), which is a Ni—Co—Mn ternary lithium metal oxide (NCM).

In the present invention, the cathode active material is preferably a Ni—Co—Mn ternary lithium metal oxide (NCM) represented by Chemical Formula 3 below.

$$LiNi_pCo_qMn_rO_2$$ [Chemical Formula 3]

In Chemical Formula 3, 0<p<0.9, 0<q<0.5, 0<r<0.5, and p+q+r=1.

Also, the conductive material may include carbon black, acetylene black, Ketjen black, and the like, and is preferably carbon black.

In the present invention, each of the first lithium salt and the second lithium salt may independently include at least one selected from among lithium perchlorate (LiClO$_4$), lithium trifluoromethane sulfonate (LiCF$_3$SO$_3$), lithium hexafluorophosphate (LiPF$_6$), lithium tetrafluoroborate (LiBF$_4$), and lithium bistrifluoromethanesulfonyl imide (LiN(CF$_3$SO$_2$)$_2$).

In the present invention, the all-solid-state lithium secondary battery 100 may be configured such that the first conductive polymer and the second conductive polymer are polyethylene oxide, the cathode active material is a Ni—Co—Mn ternary lithium metal oxide (NCM), the first lithium salt and the second lithium salt are lithium perchlorate (LiClO$_4$), and the conductive material is carbon black.

In an embodiment of the present invention, the all-solid-state lithium secondary battery 100 preferably includes a cathode containing a gallium (Ga)-doped LLZO solid electrolyte, polyethylene oxide, a Ni—Co—Mn ternary lithium metal oxide (NCM), lithium perchlorate (LiClO$_4$) and carbon black; an anode containing lithium metal; and a composite solid electrolyte layer disposed between the cathode and the anode and configured to contain a gallium (Ga)-doped LLZO solid electrolyte, polyethylene oxide and lithium perchlorate (LiClO$_4$).

EXAMPLES

A better understanding of the present invention will be given through the following preferable examples, which are set forth to illustrate but are not to be construed as limiting the scope of the present invention.

Example 1: Preparation of Sintered Pellet of 0.2 mol Ga-Doped Solid Electrolyte

As starting materials, lanthanum nitrate (La(NO$_3$)$_3$.6H$_2$O), zirconium hydrochloride (ZrOCl$_2$.2H$_2$O)

and gallium nitrate ($Ga(NO_3)_3 \cdot 9H_2O$) were dissolved in distilled water so that the molar ratio of La:Zr:Ga, as the metal elements thereof, was 3:2:0.2, thus preparing a 1 M starting material solution.

A solid electrolyte was prepared using a Couette-Taylor vortex reactor as shown in FIG. 2. The Couette-Taylor vortex reactor includes a solution inlet 1, a temperature control solution outlet 2, a temperature control solution inlet 3, a reaction solution drain portion 4, a reactant (slurry type) outlet 5, a stirring rod 6, a solution reaction portion 7, and a reaction solution temperature control portion 8. The starting material solution, 0.6 mol of ammonia water as a complexing agent, and an appropriate amount of sodium hydroxide aqueous solution were added via the inlet 1 of the Couette-Taylor vortex reactor, thus obtaining a mixed solution having a pH of 11, which was then subjected to coprecipitation at a reaction temperature of 25° C. for 4 hr at a stirring rate of the stirring rod of 1,300 rpm to give a precursor slurry in a liquid slurry phase, which was then discharged through the outlet 5.

The precursor slurry was washed with purified water and dried for 24 hr. The dried precursor was pulverized using a ball mill, and added with $LiOH \cdot H_2O$ as a lithium source such that the molar ratio (Li:Ga) of Li of $LiOH \cdot H_2O$ and Ga of gallium nitrate ($Ga(NO_3)_3 \cdot 9H_2O$) was 7.04:0.20, followed by mixing using a ball mill, thus preparing a mixture. $LiOH \cdot H_2O$ of the mixture was added (10 wt % in excess) so that the Li content of $LiOH \cdot H_2O$ was 110 parts by weight based on 100 parts by weight of Li of the produced solid electrolyte. The mixture was calcined at 900° C. for 2 hr and then pulverized, thereby preparing a 0.2 mol gallium (Ga)-doped $Li_{6.4}Ga_{0.2}La_3Zr_2O_{12}$ solid electrolyte.

Subsequently, the calcined powder was formed into a pellet using a mold and then sintered at 1200° C. for 5 hr, thus manufacturing a sintered pellet.

Example 2: Preparation of Sintered Pellet of 0.2 mol Ga-Doped Solid Electrolyte

A sintered solid electrolyte pellet was manufactured in the same manner as in Example 1, with the exception that the calcination was performed at 800° C.

Comparative Example 1: Preparation of Sintered Pellet of 0.25 mol Al-Doped Solid Electrolyte As starting materials, lanthanum nitrate ($La(NO_3)_3 \cdot 6H_2O$), zirconium hydrochloride ($ZrOCl_2 \cdot 2H_2O$) and aluminum nitrate ($Al(NO_3)_3 \cdot 9H_2O$) were dissolved in distilled water so that the molar ratio of La:Zr:Al, as the metal elements thereof, was 3:2:0.25, thus preparing a 1 M starting material solution.

A solid electrolyte was prepared using a Couette-Taylor vortex reactor as shown in FIG. 2. The Couette-Taylor vortex reactor includes a solution inlet 1, a temperature control solution outlet 2, a temperature control solution inlet 3, a reaction solution drain portion 4, a reactant (slurry type) outlet 5, a stirring rod 6, a solution reaction portion 7, and a reaction solution temperature control portion 8. The starting material solution, 0.6 mol of ammonia water as a complexing agent, and an appropriate amount of sodium hydroxide aqueous solution were added via the inlet 1 of the Couette-Taylor vortex reactor, thus obtaining a mixed solution having a pH of 11, which was then subjected to coprecipitation at a reaction temperature of 25° C. for 4 hr at a stirring rate of the stirring rod of 1,300 rpm to give a precursor slurry in a liquid slurry phase, which was then discharged through the outlet 5.

The precursor slurry was washed with purified water and dried for 24 hr. The dried precursor was pulverized using a ball mill, and added with $LiOH \cdot H_2O$ as a lithium source such that the molar ratio (Li:Al) of Li of $LiOH \cdot H_2O$ and Al of aluminum nitrate ($Al(NO_3)_3 \cdot 9H_2O$) was 6.44:0.25, followed by mixing using a ball mill, thus preparing a mixture. $LiOH \cdot H_2O$ of the mixture was added (3 wt % in excess) so that the Li content of $LiOH \cdot H_2O$ was 103 parts by weight based on 100 parts by weight of Li of the produced solid electrolyte. The mixture was calcined at 900° C. for 2 hr and then pulverized, thereby preparing a 0.25 mol aluminum (Al)-doped $Li_{6.25}Al_{0.25}La_3Zr_2O_{12}$ solid electrolyte.

Subsequently, the calcined powder was formed into a pellet using a mold and then sintered at 1200° C. for 5 hr, thus manufacturing a sintered pellet.

Comparative Example 2: Preparation of Sintered Pellet of 0.2 mol Ga-Doped Solid Electrolyte Through Batch Reaction A solid electrolyte was prepared using a batch-type coprecipitation reactor, in lieu of a Couette-Taylor vortex reactor, and the preparation process was as follows.

As starting materials, lanthanum nitrate ($La(NO_3)_3 \cdot 6H_2O$), zirconium hydrochloride ($ZrOCl_2 \cdot 2H_2O$) and gallium nitrate ($Ga(NO_3)_3 \cdot 9H_2O$) were dissolved in distilled water so that the molar ratio of La:Zr:Ga, as the metal elements thereof, was 3:2:0.2, thus preparing a 1 M starting material solution.

The starting material solution, 0.6 mol of ammonia water as a complexing agent, and an appropriate amount of sodium hydroxide aqueous solution were added, thus obtaining a mixed solution having a pH of 11, which was then subjected to coprecipitation with stirring at a reaction temperature of 25° C. for 24 hr to give a precursor slurry in a liquid slurry phase.

The precursor slurry was washed with purified water and dried for 24 hr. The dried precursor was pulverized using a ball mill, and added with $LiOH \cdot H_2O$ as a lithium source such that the molar ratio (Li:Ga) of Li of $LiOH \cdot H_2O$ and Ga of gallium nitrate ($Ga(NO_3)_3 \cdot 9H_2O$) was 6.40:0.20, followed by mixing using a ball mill, thus preparing a mixture. $LiOH \cdot H_2O$ of the mixture was added (10 wt % in excess) so that the Li content of $LiOH \cdot H_2O$ was 110 parts by weight based on 100 parts by weight of Li of the produced solid electrolyte. The mixture was calcined at 900° C. for 2 hr and then pulverized, thereby preparing a solid electrolyte.

Subsequently, the calcined powder was formed into a pellet using a mold and then sintered at 1200° C. for 5 hr, thus manufacturing a sintered pellet.

Manufacture of All-Solid-State Lithium Secondary Battery

Preparation Example 1: Preparation of Composite Solid Electrolyte Layer

Figure 10:
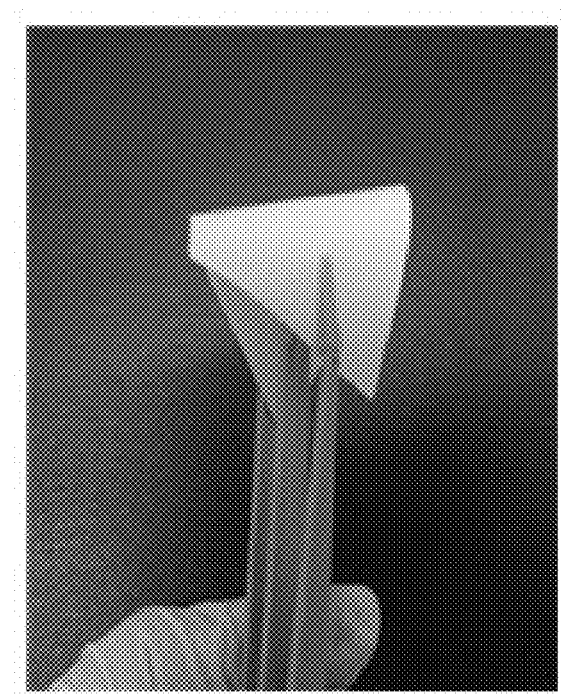
FIG. 10 shows a composite solid electrolyte film sheet of Preparation Example 1.

FIG. 10 shows a composite solid electrolyte film sheet according to the present invention. With reference to FIG. 10, Ga-LLZO and a polyethylene oxide (PEO) solid electrolyte binder were weighed such that the amount of Ga-LLZO was 70 wt % based on the total weight (Ga-LLZO+PEO) of Ga-LLZO of Example 1 and PEO (melting temperature: 65° C.), and were then stirred at 2,000 rpm for 5 min using a Thinky mixer, thus preparing a mixture.

Here, the PEO solid electrolyte binder was a mixed solution including PEO, ACN and $LiClO_4$, the PEO solid electrolyte binder was designed to have ionic conductivity, and the content ratio of PEO and $LiClO_4$ was [EO]:[Li]=15:1.

The mixture was mixed with ACN and stirred using a Thinky mixer, and thus the viscosity thereof was adjusted to a proper level. Thereafter, the resulting mixture was added with zirconia balls having a size of 2 mm and stirred for 5 min at 2,000 rpm using a Thinky mixer, thus preparing a slurry. The slurry was cast on a PET (polyethylene terephthalate) film and dried at room temperature, thereby manufacturing a composite solid electrolyte layer having a thickness of 150 μm.

Preparation Example 2: Preparation of Polyethylene Oxide Film

A polyethylene oxide film was manufactured in the same manner as in Preparation Example 1, with the exception that the Ga-LLZO of Example 1 was not added.

Preparation Example 3: Manufacture of Cathode (A)

100 parts by weight of a cathode active material (lithium nickel cobalt manganese oxide, NCM), 0 parts by weight of Ga-LLZO of Example 1, 12.5 parts by weight of a PEO binder, and 12.5 parts by weight of a conductive material (Super-p) were mixed. (NCM:Ga-LLZO:PEO:Super-p=80:0:10:10 (wt %))

Here, the PEO binder was a mixed solution including PEO (melting temperature: 65° C.), ACN and $LiClO_4$, the PEO binder was designed to have ionic conductivity, and the content ratio of PEO and $LiClO_4$ was [EO]:[Li]=15:1.

Specifically, NCM, Ga-LLZO of Example 1 and Super-p were weighed at the above weight ratio and then mixed for 30 min using a mortar and pestle, thus preparing a mixed powder. The mixed powder was placed in a vessel for a Thinky mixer and the PEO binder was also added thereto at the above weight ratio, after which the vessel was placed in the mixer, followed by mixing three times for 5 min at 2,000 rpm, thus preparing a mixture. Thereafter, the mixture was added with ACN (acetonitrile) to obtain appropriate viscosity, and was then added with zirconia balls and mixed at 2,000 rpm for 5 min, thus preparing a slurry. Finally, the slurry was cast on a piece of aluminum foil, dried in a vacuum oven at 60° C. for 24 hr and pressed, thereby manufacturing a cathode (A).

Preparation Example 4: Manufacture of Cathode (B)

A cathode (B) was manufactured in the same manner as in Preparation Example 3, with the exception that 100 parts by weight of a cathode active material (lithium nickel cobalt manganese oxide, NCM), 14.3 parts by weight of Ga-LLZO of Example 1, 14.3 parts by weight of a PEO binder, and 14.3 parts by weight of a conductive material (Super-p) were mixed, in lieu of mixing 100 parts by weight of the cathode active material (lithium nickel cobalt manganese oxide, NCM), 0 parts by weight of the Ga-LLZO of Example 1, 12.5 parts by weight of the PEO binder, and 12.5 parts by weight of the conductive material (Super-p). (NCM:Ga-LLZO:PEO:Super-p=70:10:10:10 (wt %))

Preparation Example 5: Manufacture of Cathode (C)

A cathode (C) was manufactured in the same manner as in Preparation Example 3, with the exception that 100 parts by weight of a cathode active material (lithium nickel cobalt manganese oxide, NCM), 23.1 parts by weight of Ga-LLZO of Example 1, 15.4 parts by weight of a PEO binder, and 15.4 parts by weight of a conductive material (Super-p) were mixed, in lieu of mixing 100 parts by weight of the cathode active material (lithium nickel cobalt manganese oxide, NCM), 0 parts by weight of the Ga-LLZO of Example 1, 12.5 parts by weight of the PEO binder, and 12.5 parts by weight of the conductive material (Super-p). (NCM:Ga-LLZO:PEO:Super-p=65:15:10:10 (wt %))

Preparation Example 6: Manufacture of Cathode (D)

A cathode (D) was manufactured in the same manner as in Preparation Example 3, with the exception that 100 parts by weight of a cathode active material (lithium nickel cobalt manganese oxide, NCM), 33.3 parts by weight of Ga-LLZO of Example 1, 16.7 parts by weight of a PEO binder, and 16.7 parts by weight of a conductive material (Super-p) were mixed, in lieu of mixing 100 parts by weight of the cathode active material (lithium nickel cobalt manganese oxide, NCM), 0 parts by weight of the Ga-LLZO of Example 1, 12.5 parts by weight of the PEO binder, and 12.5 parts by weight of the conductive material (Super-p). (NCM:Ga-LLZO:PEO:Super-p=60:20:10:10 (wt %))

Preparation Example 7: Manufacture of Cathode (E)

A cathode (E) was manufactured in the same manner as in Preparation Example 3, with the exception that 100 parts by weight of a cathode active material (lithium nickel cobalt manganese oxide, NCM), 60 parts by weight of Ga-LLZO of Example 1, 20 parts by weight of a PEO binder, and 20 parts by weight of a conductive material (Super-p) were mixed, in lieu of mixing 100 parts by weight of the cathode active material (lithium nickel cobalt manganese oxide, NCM), 0 parts by weight of the Ga-LLZO of Example 1, 12.5 parts by weight of the PEO binder, and 12.5 parts by weight of the conductive material (Super-p). (NCM:Ga-LLZO:PEO:Super-p=50:30:10:10 (wt %))

Device Example 1

The cathode (B) of Preparation Example 4 and the composite solid electrolyte layer of Preparation Example 1 were punched at a size of ϕ16 and then stacked. Next, heating at about 50 to 60° C. and pressurization were performed, thus manufacturing a stack. Lithium metal was placed on the stack, thereby manufacturing an all-solid-state lithium secondary battery as a 2032 coin cell.

Device Example 2

An all-solid-state lithium secondary battery was manufactured in the same manner as in Device Example 1, with the exception that the cathode (C) of Preparation Example 5 was used in lieu of the cathode (B) of Preparation Example 4.

Device Example 3

An all-solid-state lithium secondary battery was manufactured in the same manner as in Device Example 1, with the exception that the cathode (D) of Preparation Example 6 was used in lieu of the cathode (B) of Preparation Example 4.

Device Example 4

An all-solid-state lithium secondary battery was manufactured in the same manner as in Device Example 1, with the exception that the cathode (E) of Preparation Example 7 was used in lieu of the cathode (B) of Preparation Example 4.

Device Comparative Example 1

An all-solid-state lithium secondary battery was manufactured in the same manner as in Device Example 1, with the exception that the cathode (A) of Preparation Example 3 was used in lieu of the cathode (B) of Preparation Example 4.

TEST EXAMPLES

Test Example 1: Measurement of Ionic Conductivity and Impedance

The sintered pellets of Examples 1 and 2 and Comparative Examples 1 and 2 were measured for ionic conductivity and impedance through EIS (Electrochemical Impedance Spectroscopy). The results are shown in Table 1 below and in FIGS. 3 and 4.

TABLE 1

| Process | LLZO Doping composition and calcination temperature | Impedance ($\Omega \cdot cm^2$) | Total ionic conductivity ($\sigma_t$) (S/cm) at R.T |
|---|---|---|---|
| Taylor reaction (Example 1) | Ga—0.20 mol (@900° C.) | 94.38 | $1.49 \times 10^{-3}$ |
| Taylor reaction (Example 2) | Ga—0.20 mol (@800° C.) | 161.30 | $1.31 \times 10^{-3}$ |
| Taylor reaction (Comparative Example 1) | Al—0.25 mol (@900° C.) | 439.59 | $3.03 \times 10^{-4}$ |
| Batch reaction (Comparative Example 2) | Ga—0.20 mol (@900° C.) | 459.34 | $3.90 \times 10^{-4}$ |

Figure 3:
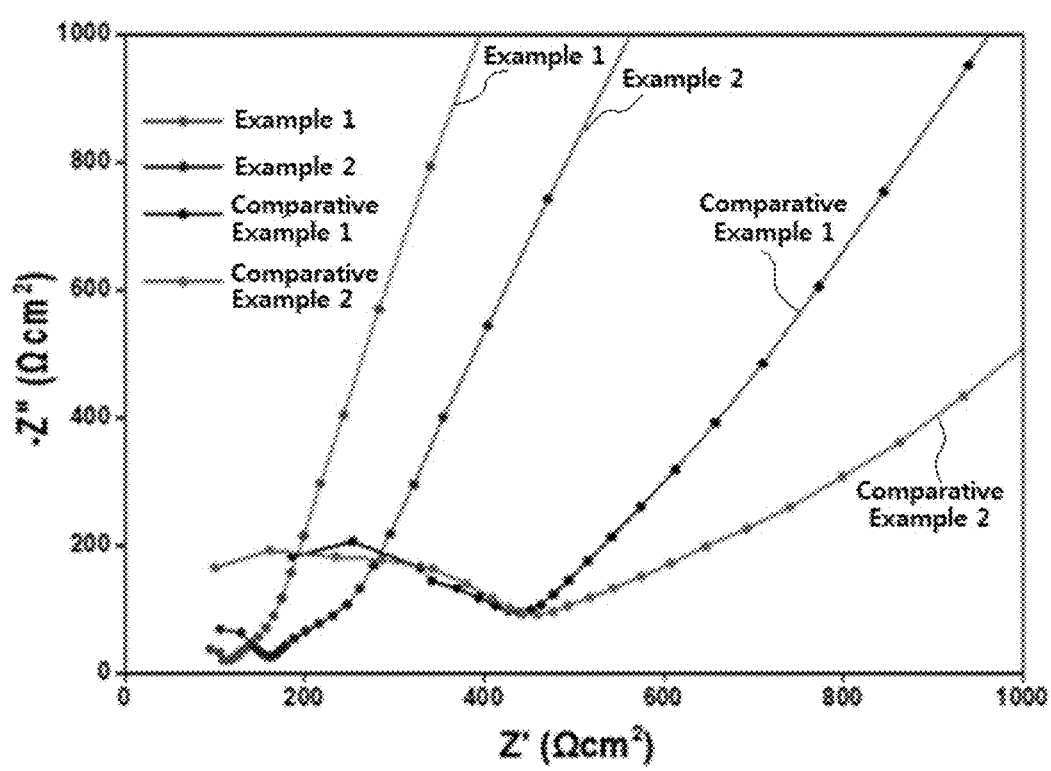
FIG. 3 is a graph showing the resistance values of sintered pellets of Examples 1 and 2 and Comparative Examples 1 and 2, measured through EIS.
Figure 4:
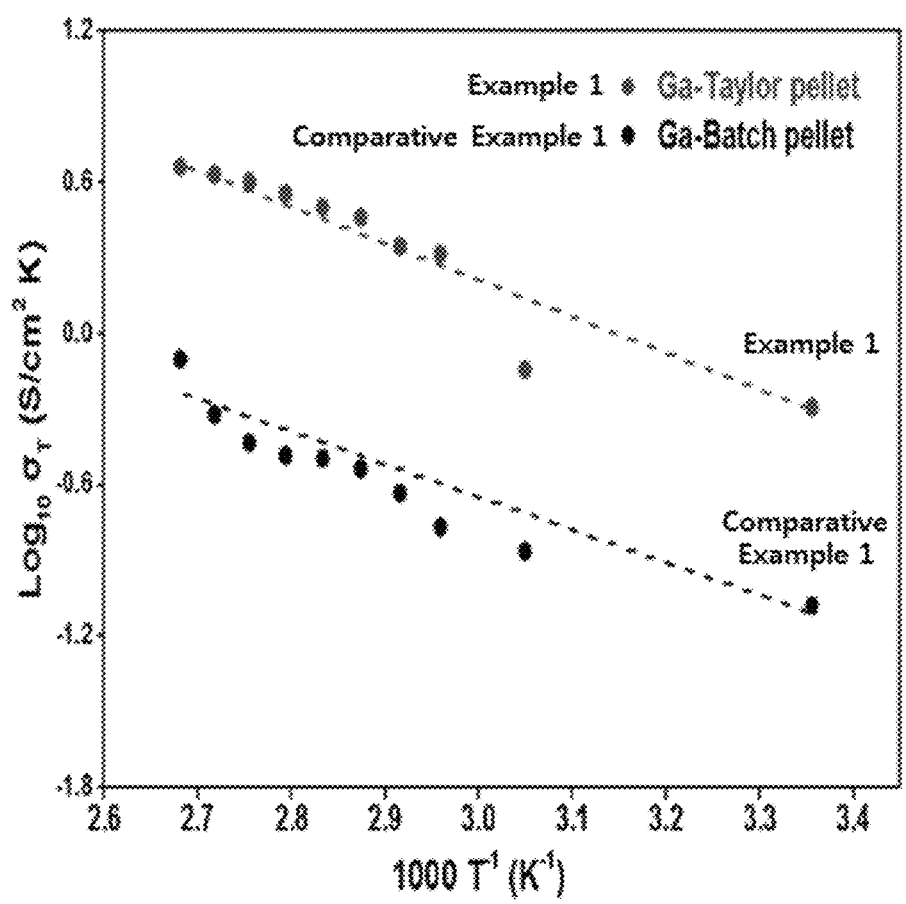
FIG. 4 is a graph showing changes in ionic conductivity of Example 1 and Comparative Example 1 depending on the temperature.

FIG. 3 shows the resistance value of the final sintered pellet measured through EIS, and the results of calculation of ionic conductivity using the same are shown and summarized in FIG. 4 and Table 1. The Ga-doped LLZO exhibited superior ionic conductivity compared to Al-doped LLZO, and also very high conductivity was confirmed in a Taylor reaction when using the same composition. In particular, the highest ionic conductivity ($1.49 \times 10^{-3}$ S/cm @R.T) was manifested under conditions of 0.2 mol Ga doping through a Taylor reaction and calcination at 900° C. These results showed that the oxide-based solid electrolyte obtained through coprecipitation exhibits the highest ionic conductivity.

Figure 5:
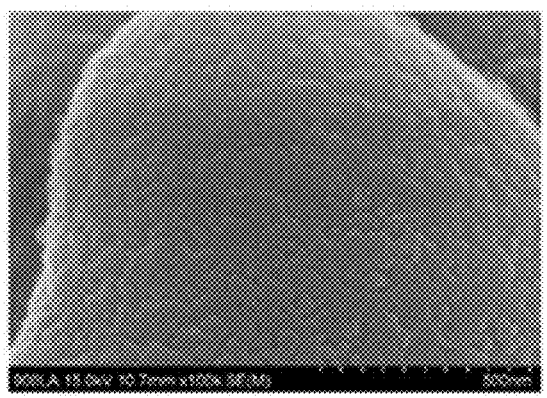
FIG. 5 shows the results of SEM observation of the surface of the solid electrolyte powder under calcination conditions of Examples 1 and 2 and Comparative Examples 1 and 2.
Figure 5:
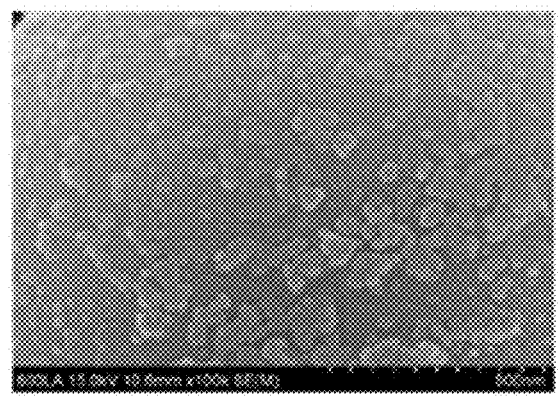
Figure 5:
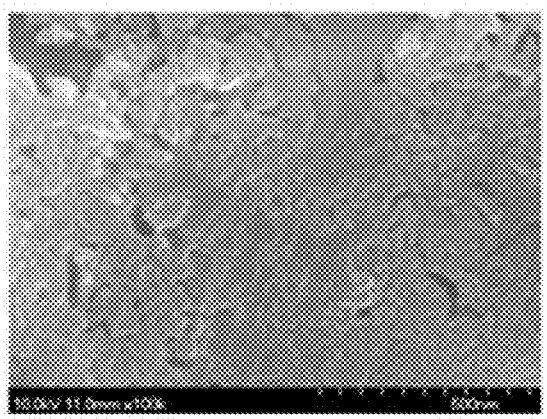
Figure 5:
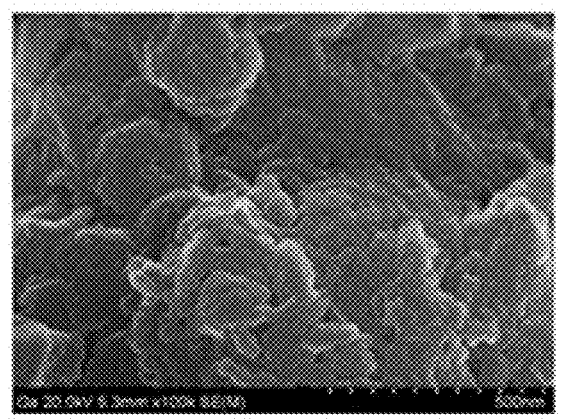

Test Example 2: Microstructural Properties (SEM) of LLZO Powder Through Doping and Synthesis Processes The results of SEM observation of the surface morphology of the solid electrolyte powder under calcination conditions of Examples 1 and 2 and Comparative Examples 1 and 2 are shown in FIG. 5. In Examples 1 and 2, spherical nanoparticles having a size of about 50 nm were uniformly formed. However, in Comparative Examples 1 and 2, the powder was agglomerated, and thus the particle size was increased to about 200 nm. Accordingly, the formation of the nanoparticles of Examples 1 and 2 is deemed to affect the sintering properties of the pellet.

Figure 6:
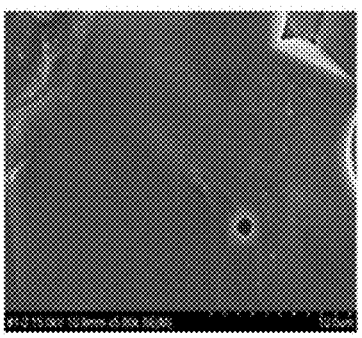
FIG. 6 shows the results of SEM observation of the cross-sections of the sintered pellets of Example 1 and Comparative Examples 1 and 2.
Figure 6:
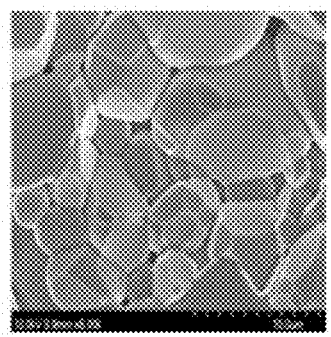
Figure 6:
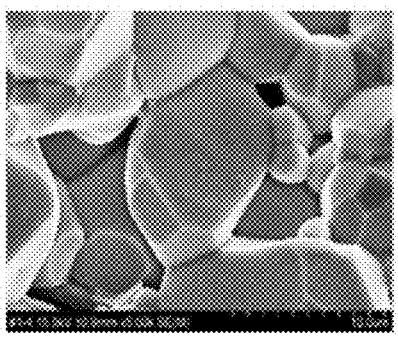

Test Example 3: Sintering Properties (SEM) of LLZO Pellet Through Doping and Synthesis Processes The results of SEM observation of the cross-sections of the sintered pellets of Example 1 and Comparative Examples 1 and 2 are shown in FIG. 6. Example 1, using a Taylor reaction, exhibited superior sinterability compared to Comparative Example 2 through coprecipitation using a batch reaction, and thus there was no grain boundary between particles, which is evaluated to contribute to improving ionic conductivity. Also, the cross-section of the pellet of Comparative Example 1 through Al doping using the same Taylor reaction was similar to that of Comparative Example 2. Therefore, high-density sintering properties can be found to result from both Taylor reaction and Ga doping.

Figure 7:
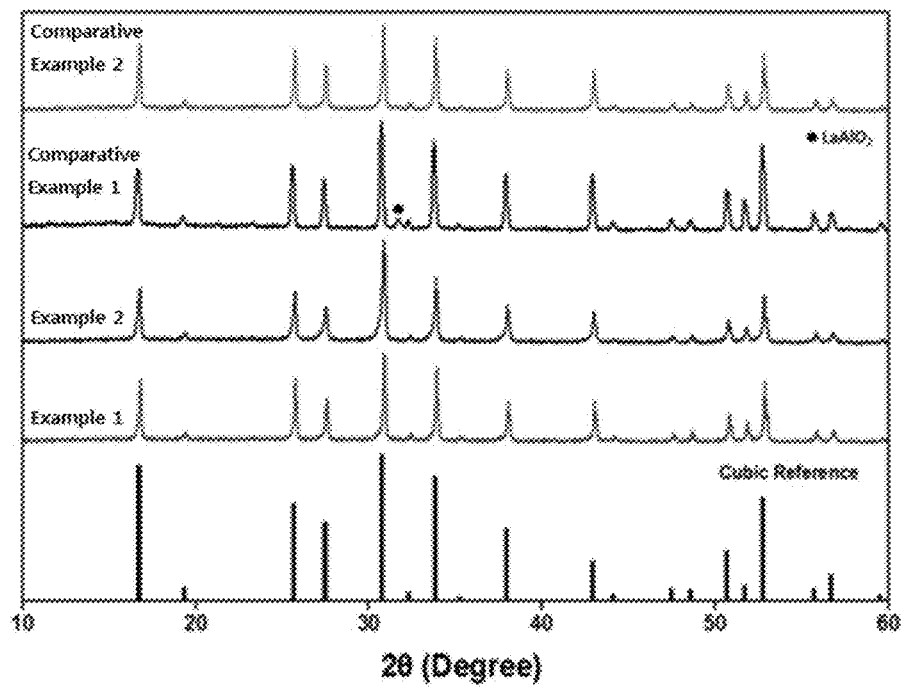
FIG. 7 shows the results of XRD of the sintered pellets of Examples 1 and 2 and Comparative Examples 1 and 2.
Figure 8:
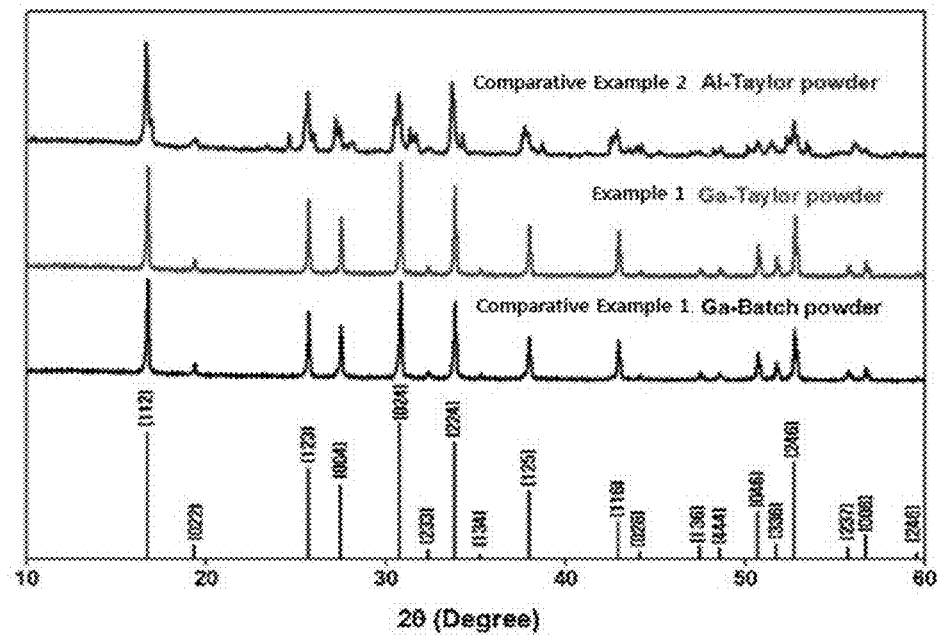
FIG. 8 shows the results of XRD of the solid electrolyte powder of Example 1 and Comparative Examples 1 and 2.

Test Example 4: Crystal Structure Properties (XRD) of LLZO Material Through Doping and Synthesis Processes The results of XRD of the sintered pellets of Examples 1 and 2 and Comparative Examples 1 and 2 are shown in FIG. 7. Also, the results of XRD of the solid electrolyte powder of Example 1 and Comparative Examples 1 and 2 are shown in FIG. 8. As shown in FIGS. 7 and 8, all the samples exhibited a typical cubic structure. However, Al doping resulted in the formation of impurities such as $LaAlO_3$. The cubic structure of the LLZO material has been reported to contribute to improving ionic conductivity, and all the samples of the present invention matched these properties. It is deemed that the cubic structure may impart ionic conductivity at a predetermined level or more but does not greatly contribute to sintering properties, which control the resistance between particles.

Test Example 5: Measurement of Impedance of Composite Solid Electrolyte Layer and Polyethylene Oxide Film FIG. 11 shows the results of measurement of impedance under conditions of 7 MHz-100 mHz and 10 mV at 70° C. after mounting of a SUS jig with each of the composite solid electrolyte layer of Preparation Example 1 and the polyethylene oxide film of Preparation Example 2 at room temperature.

Figure 11:
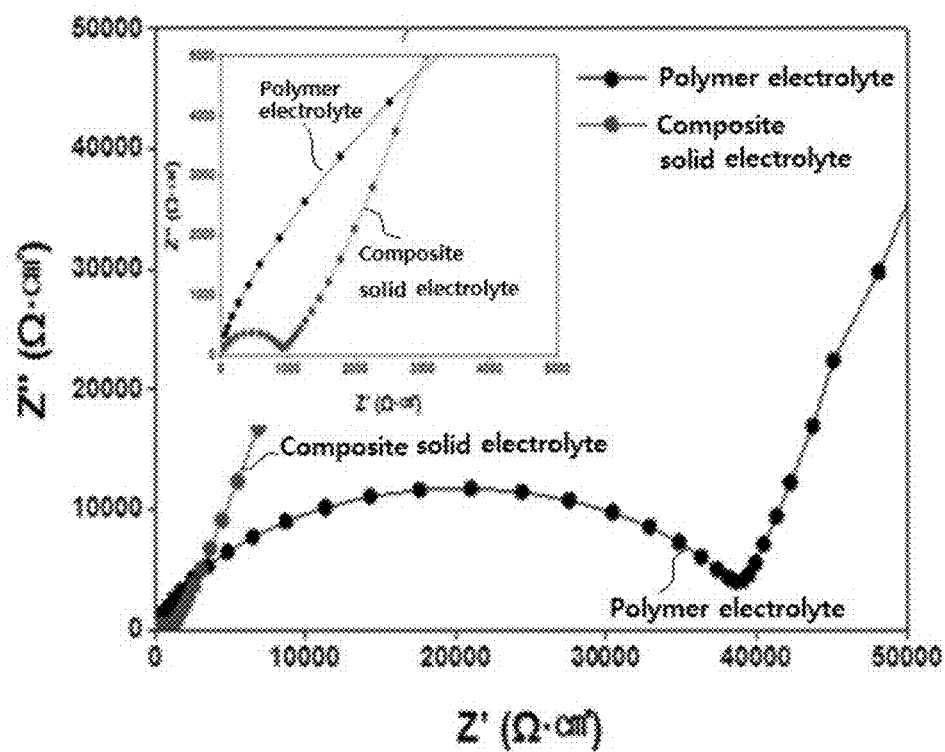
FIG. 11 shows the results of measurement of impedance of the composite solid electrolyte film of Preparation Example 1 and the polyethylene oxide film of Preparation Example 2.

With reference to FIG. 11, the composite solid electrolyte layer of Preparation Example 1 exhibited an impedance of about 1,000 $\Omega \cdot cm^2$ ($1.35 \times 10^{-4}$ S/cm), and the polyethylene oxide film of Preparation Example 2, containing no LLZO, exhibited an impedance of about 40,000 $\Omega \cdot cm^2$ (~$10^{-7}$ S/cm). Therefore, the impedance of the composite solid electrolyte layer was decreased by about 40 times or more.

Test Example 6: Measurement of Oxidation-Reduction Behavior

Figure 12:
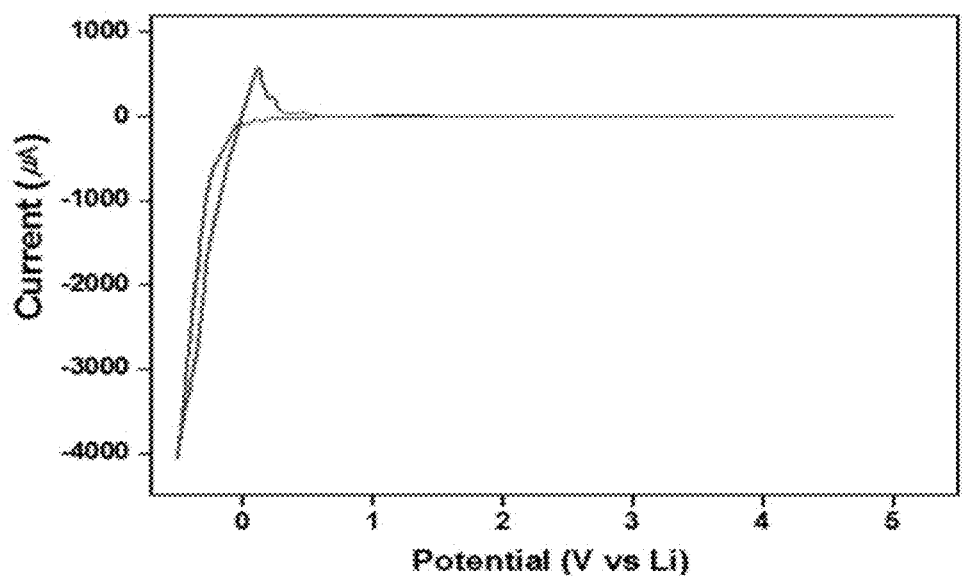
FIG. 12 shows the results of measurement of oxidation-reduction behavior of an electrochemical cell using the composite solid electrolyte layer of Preparation Example 1.

FIG. 12 shows the results of measurement of oxidation-reduction behavior in an electrochemical cell using the composite solid electrolyte layer of Preparation Example 1.

In order to evaluate electrochemical potential stability by measuring the oxidation-reduction behavior, an electrochemical cell using the above composite solid electrolyte layer was manufactured and subjected to cyclic voltammetry. The operating electrode of the electrochemical cell was made of gold-coated SUS, and the counter electrode was made of lithium metal, and 1 mV/s was applied at 70° C.

With reference to FIG. 12, the electrochemical cell including the composite solid electrolyte layer of Preparation Example 1 exhibited stable electrochemical reactivity up to about 5V, except for the oxidation-reduction behavior of lithium near 0 V.

Test Example 7: Measurement of Charge/Discharge Characteristics of Coin Cell Depending on Amounts of Cathode Active Material and LLZO of Cathode FIG. 13A shows the results of charge/discharge testing at 70° C. with current density of 0.1 C of the all-solid-state lithium secondary battery coin cells (represented by B to E in FIG. 13A) of Device Examples 1 to 4 and the all-solid-state lithium secondary battery coin cell (represented by A in FIG. 13A) of Device Comparative Example 1.

Figure 13A:
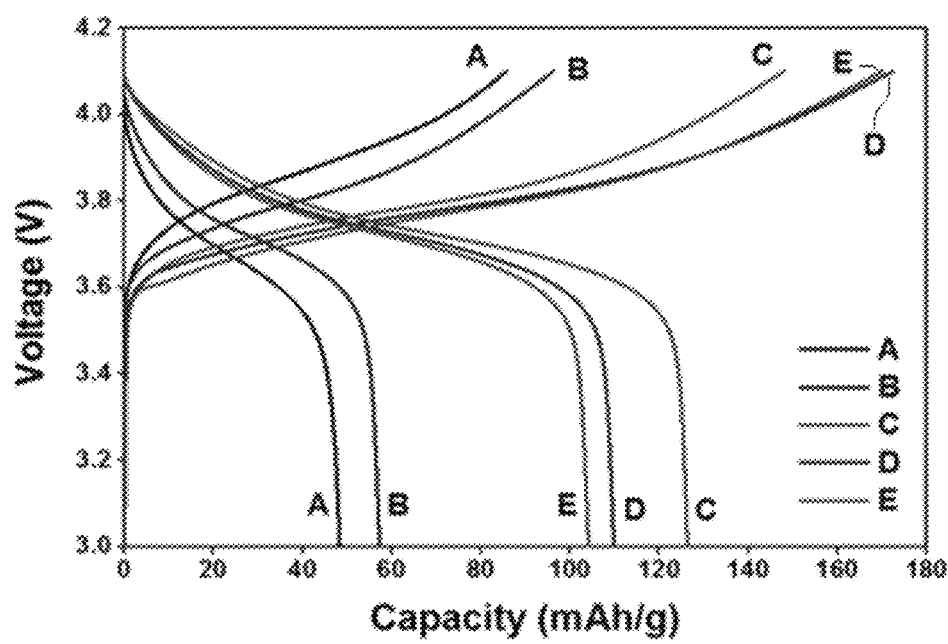
FIG. 13A shows the results of charge/discharge testing at 70° C. with current density of 0.1 C of all-solid-state lithium secondary battery coin cells of Device Examples 1 to 4 and an all-solid-state lithium secondary battery coin cell of Device Comparative Example 1.

With reference to FIG. 13A, the initial discharge capacity at 1 cycle of the all-solid-state lithium secondary battery coin cell of Device Example 2(C) was about 126 mAh/g, which is regarded as the greatest.

Also, the all-solid-state lithium secondary battery coin cell of Device Comparative Example 1(A) was low in initial capacity at 1 cycle compared to the all-solid-state lithium secondary batteries of Device Examples 1 to 4.

Therefore, the charge/discharge characteristics of the all-solid-state lithium secondary batteries of Device Examples 1 to 4, containing Ga-LLZO in the cathode, were significantly improved compared to those of the all-solid-state lithium secondary battery of Device Comparative Example 1, containing no Ga-LLZO in the cathode.

Test Example 8: Measurement of Discharge Capacity for Cycles of Coin Cell Depending on Amounts of Cathode Active Material and LLZO of Cathode FIG. 13B shows the results of measurement of discharge capacity for 10 cycles at 70° C. with current density of 0.1 C of the all-solid-state lithium secondary battery coin cells of Device Examples 1 to 4 and the all-solid-state lithium secondary battery coin cell of Device Comparative Example 1.

Figure 13B:
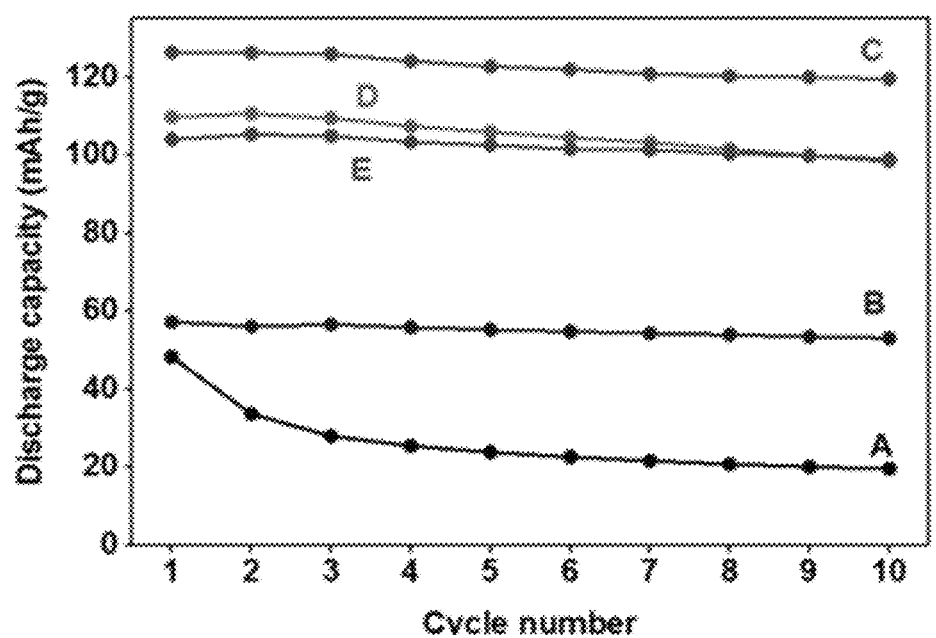
FIG. 13B shows the results of measurement of discharge capacity for 10 cycles at 70° C. with current density of 0.1 C of the all-solid-state lithium secondary battery coin cells of Device Examples 1 to 4 and the all-solid-state lithium secondary battery coin cell of Device Comparative Example 1.

With reference to FIG. 13B, the discharge capacity at 10 cycles of the all-solid-state lithium secondary battery coin cell of Device Example 2 was gradually decreased from the initial discharge capacity at 1 cycle, and was then maintained at about 120 mAh/g. Consequently, it can be confirmed that the initial discharge capacity and cycle characteristics are excellent when using 23.1 parts by weight of Ga-LLZO based on 100 parts by weight of the cathode active material (cathode active material:Ga-LLZO=65:15 (wt %)).

Also, the all-solid-state lithium secondary battery coin cell of Device Comparative Example 1 was decreased in cycle capacity compared to the all-solid-state lithium secondary batteries of Device Examples 1 to 4.

Therefore, the cycle characteristics of the all-solid-state lithium secondary battery coin cells of Device Examples 1 to 4, containing Ga-LLZO in the cathode, were significantly improved compared to those of the all-solid-state lithium secondary battery coil cell of Device Comparative Example 1, containing no Ga-LLZO in the cathode.

Although preferred embodiments of the present invention have been disclosed for illustrative purposes, those skilled in the art will appreciate that diverse variations and modifications are possible through addition, alteration, deletion, etc. of elements, without departing from the spirit and scope of the invention. For example, respective elements described in an integrated form may be discretely used, and discrete elements may be used in a state of being combined. The scope of the present invention is defined by the claims, which will be set forth below, rather than by the above detailed description, and all variations or modifications deducible from the meanings, scope and equivalents of the claims are intended to be included in the scope of the present invention.

What is claimed is:

1. A method of preparing a gallium-doped LLZO solid electrolyte, comprising:
   (a) preparing a solid electrolyte precursor slurry by subjecting a mixed solution comprising a metal aqueous solution including lanthanum (La), zirconium (Zr) and gallium (Ga), a complexing agent and a pH controller to coprecipitation;
   (b) preparing a solid electrolyte precursor by washing and drying the solid electrolyte precursor slurry;
   (c) preparing a mixture by mixing the solid electrolyte precursor with a lithium source;
   (d) preparing a gallium-doped LLZO solid electrolyte represented by Chemical Formula 1 below by calcining the mixture at 600 to 1,000° C.; and
   (e) sintering the solid electrolyte represented by Chemical Formula 1 at 1,000 to 1,300° C., after step (d),
   wherein step (a) is performed using a Couette-Taylor vortex reactor, and
   wherein a ratio (M1:M2) of mol (M1) of a lithium element of the lithium source in step (c) to mol (M2) of a gallium element of the metal aqueous solution in step (a) is adjusted such that a ratio (m1:m2) of mol (m1) of the lithium element to mol (m2) of the gallium element in Chemical Formula 1 is controlled to fall within a range of 6.7:0.1 to 5.8:0.4:

$$Li_xGa_yLa_zZr_wO_{12}, \quad \text{Chemical Formula 1}$$

where 5≤x≤9, 0<y≤4, 2≤z≤4, 1≤w≤3.

2. The method of claim 1, wherein a ratio (M1:M2) of mol (M1) of a lithium element of the lithium source in step (c) to mol (M2) of a gallium element of the metal aqueous solution in step (a) is adjusted such that a ratio (m1:m2) of mol (m1) of the lithium element to mol (m2) of the gallium element in Chemical Formula 1 is controlled to fall within a range of 6.55:0.15 to 6.25:0.25.

3. The method of claim 1, wherein the metal aqueous solution includes lanthanum nitrate hydrate (La(NO$_3$)$_3$.xH$_2$O), zirconium hydrochloride hydrate (ZrOCl$_2$.xH$_2$O) and gallium nitrate hydrate (Ga(NO$_3$)$_3$.xH$_2$O), x being independently any one integer of 1 to 9.

4. The method of claim 1, wherein the complexing agent is ammonium hydroxide (NH$_4$OH).

5. The method of claim 1, wherein the pH controller is sodium hydroxide (NaOH).

6. The method of claim 1, wherein the lithium source is lithium hydroxide hydrate (LiOH.H$_2$O).

7. The method of claim 1, wherein the gallium (Ga)-doped LLZO solid electrolyte has a total ionic conductivity (σ$_t$)

ranging from $1.2 \times 10^{-3}$ to $1.6 \times 10^{-3}$ (S/cm) measured at room temperature (RT) and a single-phase cubic structure.

\* \* \* \* \*